(12) United States Patent
Deo et al.

(10) Patent No.: US 8,628,092 B2
(45) Date of Patent: Jan. 14, 2014

(54) METHOD AND APPARATUS FOR PACKING RINGS

(75) Inventors: Hrishikesh Vishvas Deo, Saratoga Springs, NY (US); Binayak Roy, Guilderland, NY (US)

(73) Assignee: General Electric Company, Niskayuna, NY (US)

( * ) Notice: Subject to any disclaimer, the term of this patent is extended or adjusted under 35 U.S.C. 154(b) by 238 days.

(21) Appl. No.: 12/957,127

(22) Filed: Nov. 30, 2010

(65) Prior Publication Data
US 2012/0133101 A1 May 31, 2012

(51) Int. Cl.
*F16J 15/447* (2006.01)

(52) U.S. Cl.
USPC .......................... 277/412; 277/416

(58) Field of Classification Search
USPC .................. 277/411–412, 416, 543, 545, 632
See application file for complete search history.

(56) References Cited

U.S. PATENT DOCUMENTS

| | | | |
|---|---|---|---|
| 4,436,311 A | 3/1984 | Brandon | |
| 5,118,120 A * | 6/1992 | Drerup et al. | 277/628 |
| 5,395,124 A | 3/1995 | Brandon | |
| 5,709,388 A | 1/1998 | Skinner et al. | |
| 6,250,641 B1 | 6/2001 | Dinc et al. | |
| 6,343,792 B1 | 2/2002 | Shinohara et al. | |
| 6,588,764 B2 | 7/2003 | Fuller | |
| 7,384,235 B2 | 6/2008 | Adis | |
| 2006/0208427 A1* | 9/2006 | Wright et al. | 277/413 |
| 2007/0120329 A1 | 5/2007 | Chevrette | |
| 2008/0246223 A1 | 10/2008 | Justak | |

OTHER PUBLICATIONS

Ashton, Z.S., "High Temperature Leakage Performance of a Hybrid Brush Seal Compared to a Standard Brush Seal and a Labyrinth Seal," Office of Graduate Studies of Texas A&M University, Aug. 2009, 95 pages.
U.S. Appl. No. 12/692,369, filed Jan. 22, 2010, Hrishikesh Vishvas Deo.
U.S. Appl. No. 12/827,513, filed Jun. 30, 2010, Hrishikesh Vishvas Deo.

* cited by examiner

*Primary Examiner* — Vishal Patel
(74) *Attorney, Agent, or Firm* — Ann M. Agosti

(57) ABSTRACT

A seal assembly for a turbomachine is provided. The turbomachine includes a stationary housing and a rotor rotatable about an axis. The seal assembly includes a plurality of arcuate packing ring segments disposed intermediate to the rotor and the stationary housing, and a plurality of inter-segment gaps disposed between the plurality of arcuate packing ring segments. The plurality of inter-segment gaps are inclined at a first angle from a radial axis of the rotor and inclined in a direction of motion of the plurality of arcuate packing ring segments. The seal assembly also includes a biasing member disposed intermediate to the stationary housing and the plurality of arcuate packing ring segments and coupled to both.

6 Claims, 6 Drawing Sheets

METHOD AND APPARATUS FOR PACKING RINGS

BACKGROUND OF THE INVENTION

The subject matter disclosed herein relates to the field of seals used in turbomachinery. More particularly, the subject matter disclosed herein relates to a seal for application at the interface of a rotating component, such as a rotor in a turbine or compressor, and a stationary component, such as a casing or stator.

Seals used in gas turbines, steam turbines, aircraft engines, compressors, and other turbomachinery systems are susceptible to excessive leakage because a rotor clearance may be configured to be large enough to help prevent the rotor from rubbing against the seal. If the rotor does contact the seal, which is referred to as rotor-rub, the seal may be damaged creating an even larger clearance thereafter. Specifically, rotor-rub may occur in a gas turbine during a number of rotor transients that may include rotor dynamic excitation, relative thermal distortion of the rotor and stator, or shift in the center of the rotor because of development of a hydrodynamic lubricating film in the journal bearings with increasing speed. Deflection may occur when a gas turbine passes through critical speeds, such as during start-up. Distortion may be caused by thermal discrepancies between different components within the gas turbine. A large clearance between the seal and rotor is needed because the seal may be unable to adjust its clearance during the rotor transients as it may be rigidly coupled to the stator. The clearances between rotating and stationary components of gas turbines may affect both the efficiency and performance of the turbine. In the design of gas turbines, close tolerances between components may result in greater efficiency. Similar rotor transients occur in other turbomachinery systems such as steam turbines, aircraft engines, or compressors, and the transients may often be difficult to predict.

In addition, seals may be configured with a Variable Clearance Positive Pressure Packing (VCPPP) ring that biases the seal away from the rotor to a large clearance by means of a spring. This helps prevent a rotor-rub during start-up rotor transients. When the differential pressure across the seal builds up beyond a certain value, the forces on the VCPPP ring cause it to close to a small rotor clearance.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a seal assembly for a turbomachine is provided. The turbomachine includes a stationary housing and a rotor rotatable about an axis. The seal assembly includes a plurality of arcuate packing ring segments disposed intermediate to the rotor and the stationary housing, and a plurality of inter-segment gaps disposed between the plurality of arcuate packing ring segments. The plurality of inter-segment gaps are inclined at a first angle from a radial axis of the rotor and inclined in a direction of motion of the plurality of arcuate packing ring segments. The seal assembly also includes a biasing member disposed intermediate to the stationary housing and the plurality of arcuate packing ring segments and coupled to both.

In a second embodiment, a seal assembly for a turbomachine is provided. The turbomachine includes a stationary housing and a rotor rotatable about an axis. The seal assembly includes a plurality of arcuate packing ring segments disposed intermediate to the rotor and the stationary housing, and a plurality of inter-segment gaps disposed between the plurality of arcuate packing ring segments. The plurality of inter-segment gaps are configured along a radial axis of the rotor. The seal assembly also includes a plurality of biasing members disposed intermediate to the stationary housing and the plurality of arcuate packing ring segments and coupled to both. The plurality of biasing members are V-shaped when viewed along the axis of the rotor and are symmetrically coupled to the plurality of arcuate packing ring segments.

In a third embodiment, a segment of a circumferentially-segmented seal assembly configured to be disposed intermediate to a rotor and a stationary housing is provided. The segment includes an arcuate packing ring segment comprising radial surfaces inclined at a first angle from a radial axis of the arcuate packing ring segment and configured to be disposed intermediate to the rotor and the stationary housing.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
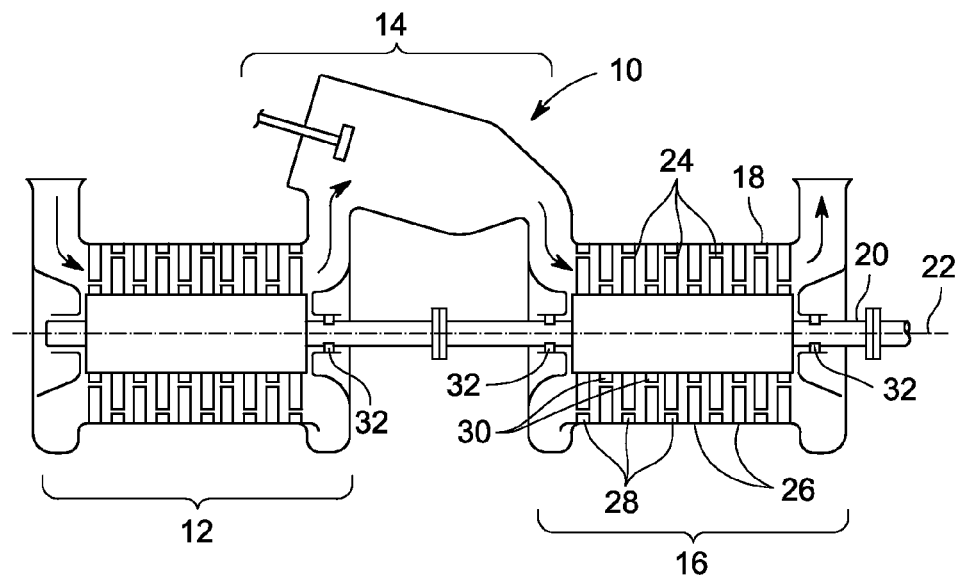
FIG. 1 is a cross-sectional view of a turbine system in accordance with an embodiment of the present disclosure.

FIG. 1 is a cross-sectional view of an embodiment of a turbine system 10, or turbomachine, which may include a variety of components, some of which are not shown for the sake of simplicity. In the illustrated embodiment, the gas turbine system 10 includes a compressor section 12, a combustor section 14, and a turbine section 16. The turbine section 16 includes a stationary housing 18 and a rotating element 20, or rotor, which rotates about an axis 22. Moving blades 24 are attached to the rotating element 20 and stationary blades 26 are attached to the stationary housing 18. The moving blades 24 and stationary blades 26 are arranged alternately in the axial direction. There are several possible locations where seal assemblies with inter-segment gaps according to various embodiments may be installed, such as location 28 between a shrouded moving blade 24 and stationary housing 18, location 30 between the rotating element 20 and stationary blade 26, or an end-packing sealing location 32 between rotating element 20 and stationary housing 18.

Figure 2:
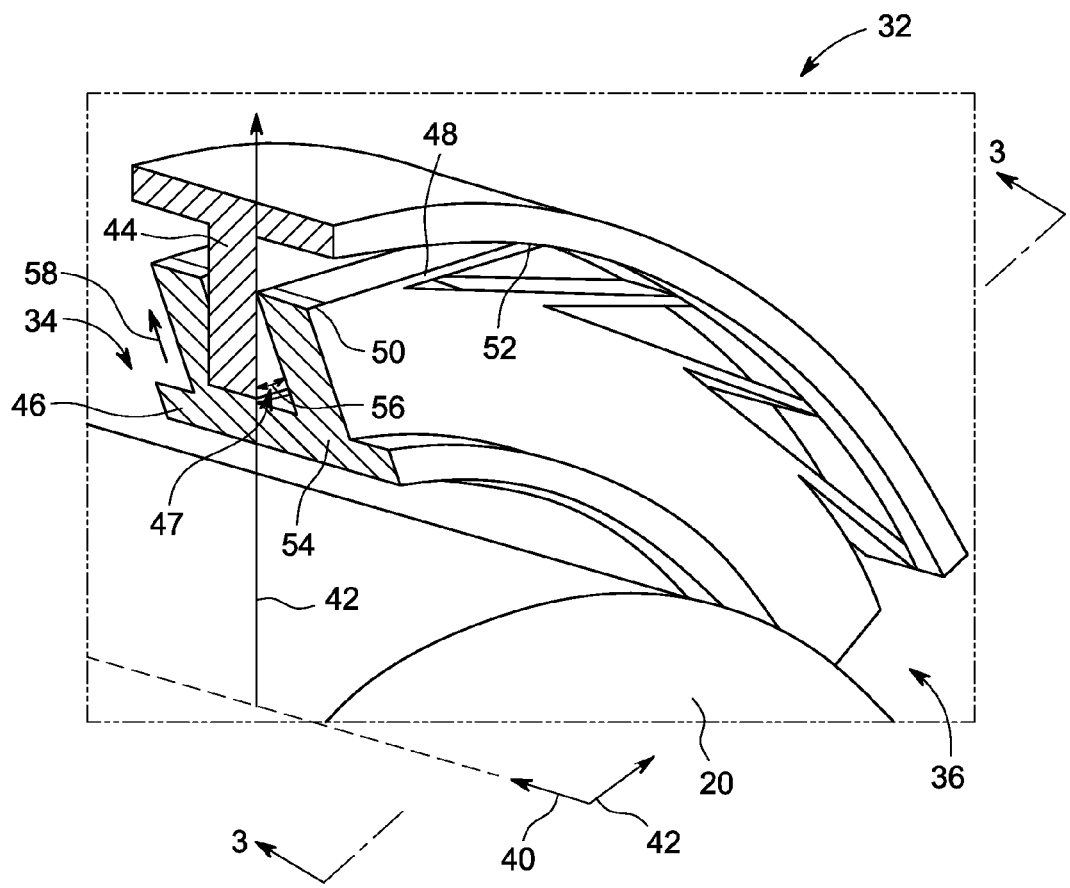
FIG. 2 is a perspective view of a sealing area of a turbine system, as shown in FIG. 1, having a seal assembly in accordance with an embodiment of the present disclosure.
Figure 3:
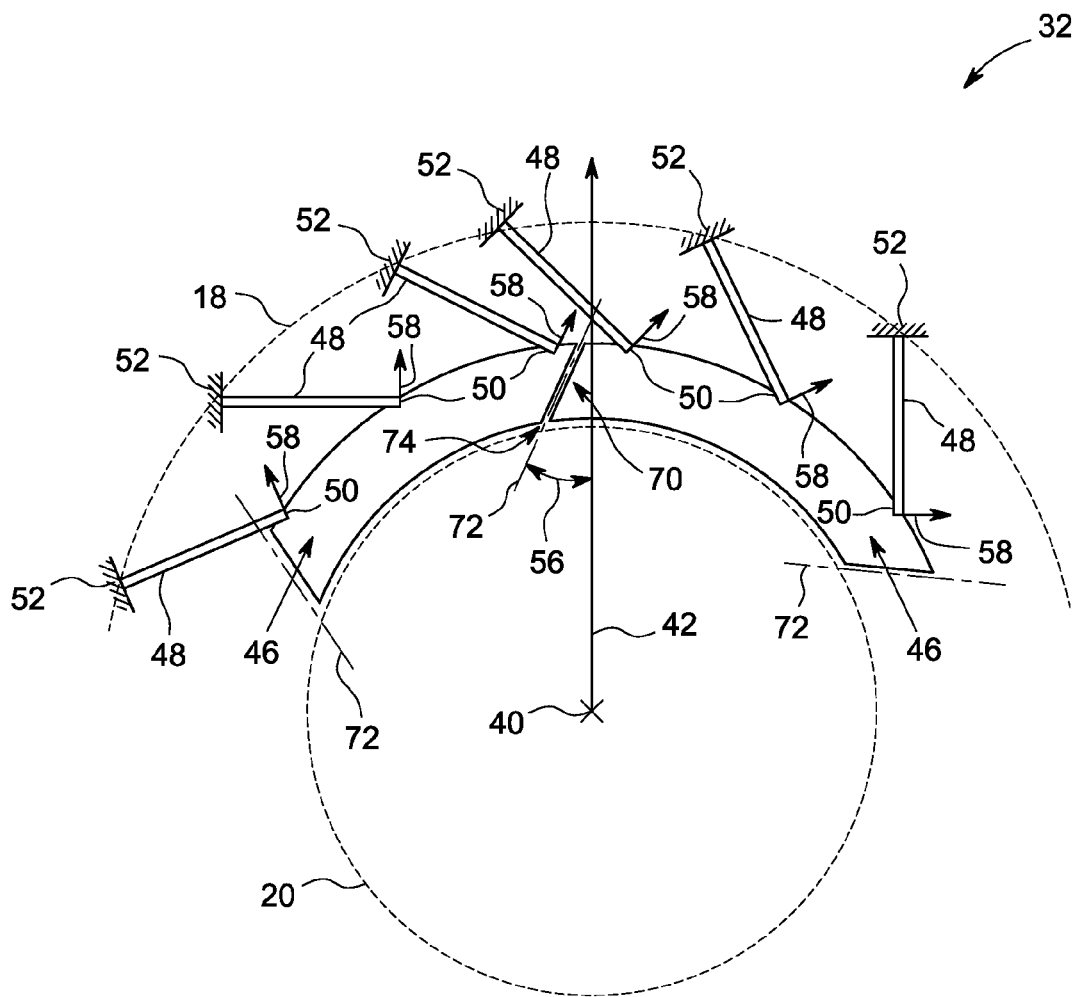
FIG. 3 is a partial radial cross-sectional view of a seal assembly with straight inter-segment gaps in accordance with an embodiment of the present disclosure.
Figure 4:
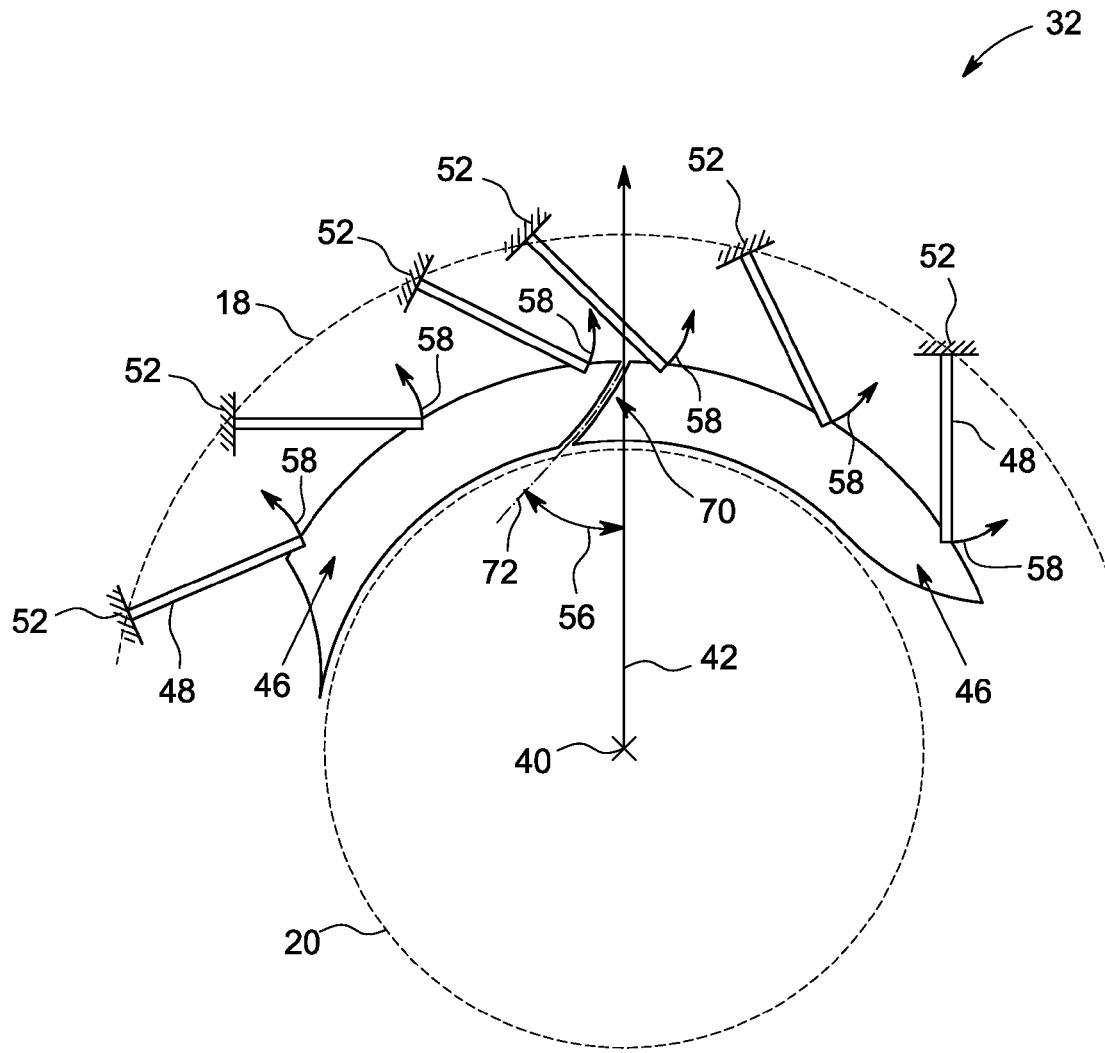
FIG. 4 is a partial radial cross-sectional view of a seal assembly with arcuate inter-segment gaps in accordance with an embodiment of the present disclosure.
Figure 5:
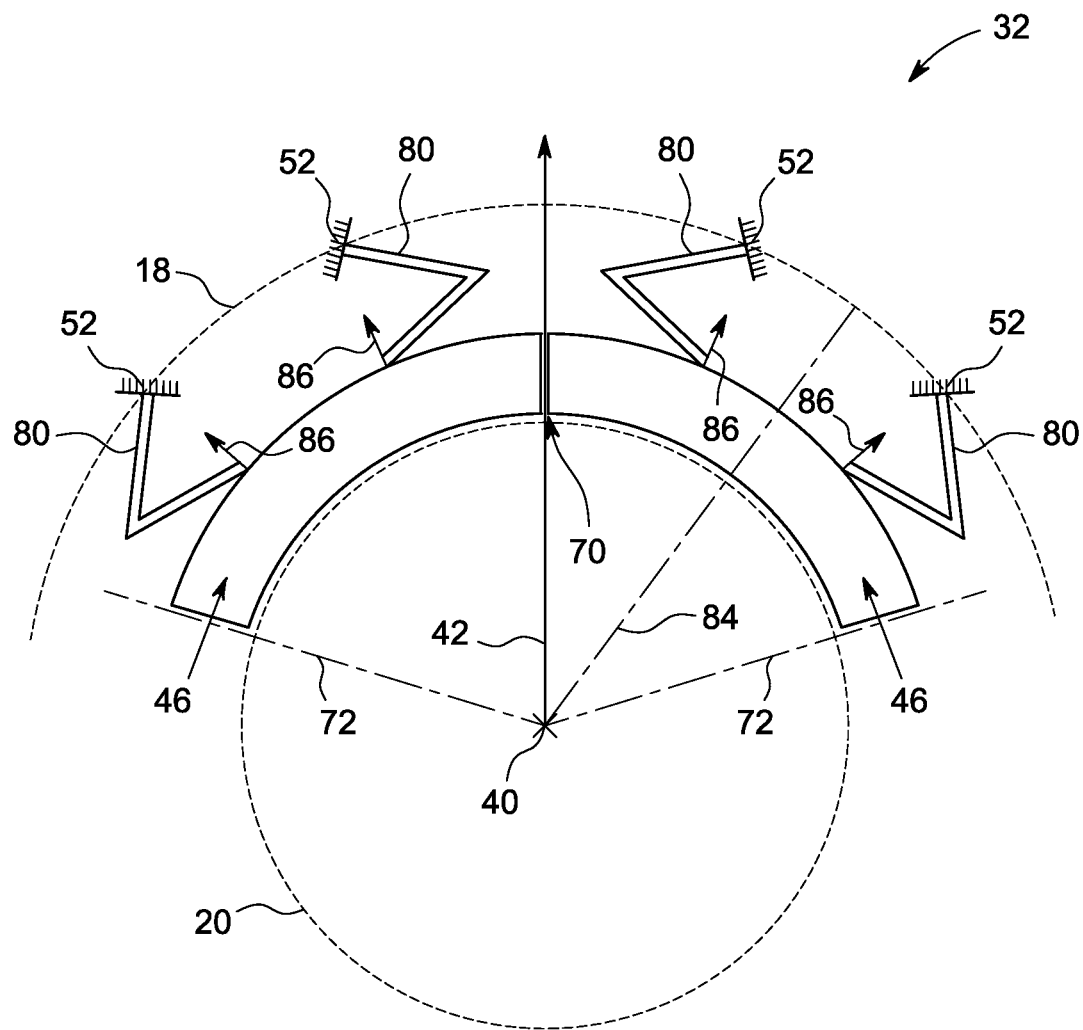
FIG. 5 is a partial radial cross-sectional view of flexures with bending joints installed in a seal assembly in accordance with an embodiment of the present disclosure.
Figure 6:
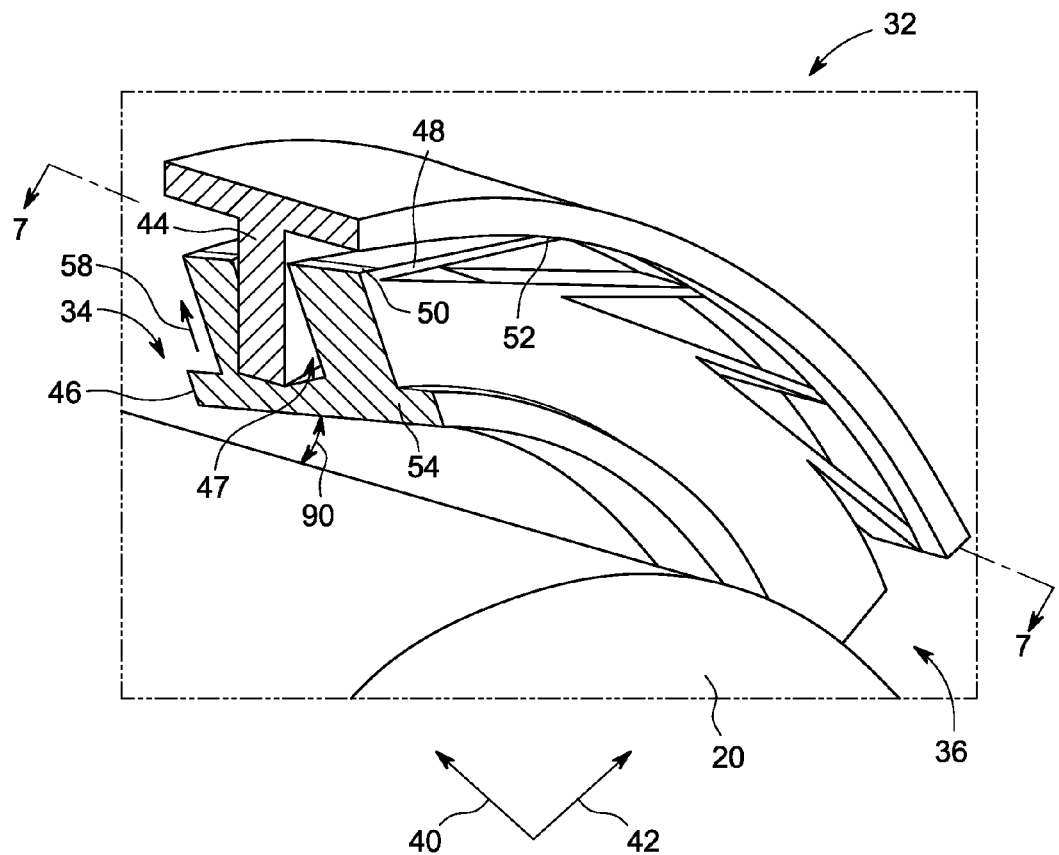
FIG. 6 is a perspective view of a sealing area of a turbine system, as shown in FIG. 1, having a seal assembly in accordance with an embodiment of the present disclosure.
Figure 7:
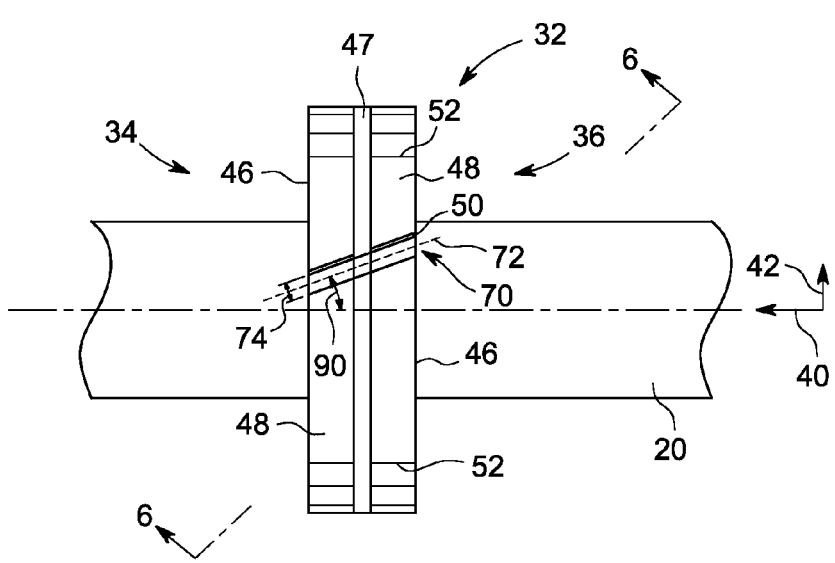
FIG. 7 is a top view of a seal assembly with inter-segment gaps inclined from an axial axis of the rotor in accordance with an embodiment of the present disclosure.

The seal assembly described herein provides a structure that allows segments of the seal assembly to move both radially and circumferentially, thereby, potentially reducing leakage and emissions and increasing efficiency. The seal assembly described herein may be used with any suitable rotary machine, such as, but not limited to, the turbine system 10 of FIG. 1. FIGS. 2 and 6 are perspective views of exemplary seal assemblies 32. FIGS. 3-5 are partial radial cross-sectional views of various embodiments of the seal assembly 32 taken along line 3-3. FIG. 7 is a top view of an embodiment of the seal assembly 32. In the illustrated embodiments, the seal assembly 32 facilitates reducing axial leakage between the rotating element 20 and the stationary housing 18. More specifically, in the exemplary embodiments, the rotating element 20 rotates relative to the stationary housing 18.

FIG. 2 is a perspective view of an embodiment of the seal assembly 32 of the turbine system 10 of FIG. 1. Air, fuel, steam, or other gases enters the turbine system 10 at an upstream side 34 and exits the system at a downstream side 36. In the illustrated embodiment, the axial direction is indicated by axis 40 and the radial direction is indicated by axis 42. An arcuate plate 44 is coupled to the arcuate surface of the stationary housing 18 facing the rotating element 20. In certain embodiments, the plate 44 may be made from steel or steel alloys. Moreover, the cross-section of the plate may appear T-shaped in certain embodiments, as depicted in FIG. 2. The plate 44 may be rigidly attached to the housing 18. In addition, the plate 44 may be disposed as a complete 360-degree ring, as two 180-degree arcs, or smaller arcs that together form a complete ring. Further, in certain embodiments, the plate 44 may consist of a plurality of plates similarly configured.

An arcuate packing ring segment 46 is disposed intermediate to the plate 44 and the rotating element 20. One or more arcuate packing ring segments 46 may together form a complete ring. In other words, the seal assembly 32 may be referred to as circumferentially-segmented. In certain embodiments, the arcuate packing ring segment 46 may be made from steel or steel alloys. Moreover, the arcuate packing ring segment 46 is configured to mate with the plate 44, with a gap 47. Biasing members 48 are disposed intermediate to the stationary housing 18 and the arcuate packing ring segment 46. The biasing members 48 act as bearing flexures and provide a high stiffness in the axial direction 40 and a low stiffness in the radial direction 42. The high axial stiffness restricts significant motion in the axial direction. The low radial stiffness allows the arcuate packing ring segment 46 to move in the radial direction. In addition, the biasing member 48 supports the weight of the arcuate packing ring segment 46 and prevents it from touching the rotating element 20 under no-flow conditions. In certain embodiments, the biasing member 48 may consist of a plurality of flexures. A first end 50 of each flexure may be mechanically coupled to the arcuate packing ring segment 46 and a second end 52 of each flexure may be mechanically coupled to the stationary housing 18 or to the plate 44 when it is T-shaped. In certain embodiments, examples of mechanically coupling may include bolting, welding, or other suitable techniques for mechanically affixing two structures. In other embodiments, the first end 50 may be an integral part of the arcuate packing ring segment 46 and the second end 52 mechanically affixed to the housing 18. In yet another embodiment, the second end 52 may be an integral part of the stationary housing 18 or plate 44 when it is T-shaped, and the first end 50 mechanically affixed to the arcuate packing ring segment 46. In this embodiment, each flexure is shown as a cantilever with a large width to thickness aspect ratio. Other flexure designs are possible that also achieve a high axial stiffness and low radial stiffness.

As illustrated in FIG. 2, a radial face 54, or surface, of the arcuate packing ring segment 46 is inclined at a first angle 56 from the radial direction 42. As discussed in detail below, the inclination of the radial face 54 allows the arcuate packing ring segment 46 to move both in a radial direction and in a circumferential direction, as indicated by arrow 58. In addition, the radial face 54 is generally flat. In other embodiments, the radial face 54 may be curved.

In addition, although not shown in FIG. 2, the surface of the arcuate packing ring segment packing ring 46 facing the rotating element 20 or the surface of the rotating element 20 itself may include various leakage reduction systems, such as, but not limited to, teeth, brushes, wires, and so forth. For example, progressive clearance labyrinth seal assemblies may include one or more arcuate teeth with decreasing clearances going from the upstream side 34 to the downstream side 36. Such seal assemblies may display self-correcting behavior when in operation. Specifically, when the clearances between tips of the arcuate teeth and the rotating element 20 increase, hydrostatic blow-down forces increase, thereby decreasing the clearances. When the clearances decrease, hydrostatic lift-off forces increase, thereby increasing the clearances. By maintaining the clearances, progressive clearance labyrinth seal assemblies help to reduce axial leakage and prevent turbine damage. Thus, progressive clearance labyrinth seal assemblies may use movement of arcuate packing ring segments 46 in a radial or circumferential direction to help maintain the desired tip clearances. Embodiments of the seal assembly 32 with inter-segment gaps as described in detail below allow such movement in progressive clearance labyrinth seal assemblies and other seal assemblies that utilize packing ring movement.

FIG. 3 is a partial cross-sectional view of the seal assembly 32 along the line labeled 3-3 in FIG. 2. In the illustrated embodiment, two arcuate packing ring segments 46 are disposed intermediate to the rotating element 20 and the stationary housing 18. The seal assembly 32 may include additional arcuate packing ring segments 46 to form a complete 360-degree ring around the rotating element 20. As shown, an inter-segment gap 70 is disposed between the two arcuate packing ring segments 46. In the depicted example, the inter-segment gaps 70 are generally straight when the inter-segment gaps 70 are viewed along the rotor axis 40. Such inter-segment gaps 70 are disposed between the additional arcuate packing ring segments 46 that form the remainder of the 360-degree ring around the rotating element 20. The inter-segment gaps 70 are aligned with an inter-segment axis 72. Thus, the inter-segment gaps 70 are inclined at the first angle 56 defined between the radial direction 42 and the inter-segment axis 72. The first angle 56 may be between approximately 0 degrees to 90 degrees, 10 degrees to 60 degrees, or 20 degrees to 40 degrees, for example. The specific value of the first angle 56 for a particular application is selected to allow the arcuate packing ring segments 46 to move both in a radial direction and in a circumferential direction, as indicated by the arrows 58. Factors such as, but not limited to, the number, width, height, shape, or configuration of the arcuate packing ring segments 46 may influence the selected value of the first angle 56.

In FIG. 3, the biasing members 48 are shown coupled to the stationary housing 18 at the first end 52 and coupled to the arcuate packing ring segments 46 at the second end 52. The biasing members 48 enable the arcuate packing ring segments 46 to move in the direction indicated by the arrows 58. In the illustrated embodiment, the inter-segment axis 72 may be generally aligned with the direction of motion 58. In other words, the inter-segment gaps 70 are inclined in the direction of motion 58. As shown, the direction of motion 58 corresponds to movement of the arcuate packing ring segments 46 in both a radial direction and in a circumferential direction. The inter-segment gaps 70 may be defined by a width 74, which may be selected based on the needs of a particular application. For example, the width 74 may be minimized to reduce leakage through the inter-segments gaps 70. In various embodiments, the width 74 may be between approximately 2 mm to 10 mm, or 4 mm to 6 mm, for example.

FIG. 4 is a partial cross-sectional view the seal assembly 32. In the illustrated embodiment, the inter-segments gaps 70 are not straight when viewed along the rotor axis 40. Instead, the inter-segments gaps 70 are generally arcuate when viewed along the rotor axis 40. Correspondingly, the inter-segment axis 72 may also be arcuate. Arcuate inter-segments gaps 70 may allow the arcuate packing ring segments 46 to move in a curved direction as indicated by the arrows 58. Such arcuate inter-segments gaps 70 may be advantageous in particular applications, such as applications with large deflections of the arcuate packing ring segments 46 (e.g., approximately 5 mm or greater). For example, the arcuate packing ring segments 46 and/or biasing members 48 may deflect or bend as they move in the radial and/or circumferential directions. Thus, arcuate inter-segments gaps 70 may accommodate any change in the direction indicated by arrows 58 caused by such deflection. Other aspects of the seal assembly 32 shown in FIG. 4 are similar to those discussed above with respect to FIG. 3.

FIG. 5 is a partial cross-sectional view of the seal assembly 32. The arcuate packing ring segments 46 shown in FIG. 5 are similar those shown in FIG. 3 with straight inter-segments gaps 70. However, the configuration of the biasing members (or flexures) in FIG. 5 is different from those shown in FIGS. 3 and 4. In FIG. 5, each arcuate packing ring segment 46 is coupled to the stationary housing 18 by a pair of V-shaped biasing members (or flexures) 80 that are symmetric about a bisecting axis (or bisecting line) 84. In other words, the bisecting axis 84 bisects the arcuate packing ring segments 46 and the V-shaped biasing members 80 are located approximately the same distance from the bisecting axis 84. The V-shape of the V-shaped biasing members 80 is apparent when viewed along the rotor axis 40. Because of the symmetric arrangement of the V-shaped biasing members 80 about the bisecting axis 84, the arcuate packing ring segments 46 move substantially in the radial direction as indicated by arrows 86. Because the circumferential motion of the arcuate packing ring segments 46 is limited in the illustrated embodiment, the inter-segments gaps 70 (and accordingly, the inter-segment axes 72) are configured along the radial direction 42. In other embodiments, more than one pair of V-shaped biasing members 80 that are symmetric with respect to the bisecting axis 84 may be coupled to each of the arcuate packing ring segments 46.

FIG. 6 is a perspective view of an embodiment of the seal assembly 32. In the illustrated embodiment, the radial face 54 of the arcuate packing ring segments 46 is inclined at a second angle 90 from the rotor axis 40. The second angle 90 may be between approximately 0 degrees to 90 degrees, 10 degrees to 60 degrees, or 20 degrees to 40 degrees, for example. The specific value of the second angle 90 for a particular application is selected to help reduce axial leakage as discussed in detail below. Factors such as, but not limited to, the number, width, height, shape, or configuration of the arcuate packing ring segments 46 may influence the selected value of the second angle 90. Other aspects of the seal assembly 32 shown in FIG. 6 are similar to the various embodiments of seal assemblies 32 discussed in detail above.

FIG. 7 is a top view of the seal assembly 32 along the line labeled 7-7 in FIG. 6. Correspondingly, the perspective view of FIG. 6 is indicated along the line labeled 6-6 in FIG. 7. In FIG. 7, the arcuate plate 44 has been removed for clarity, thus showing the gap 47 in the arcuate packing ring segments 46. As shown, the inter-segment axis 74 is inclined at the second angle 90 from the rotor axis 40. Such a configuration of the inter-segments gaps 70 may help to reduce axial leakage through the inter-segment gaps 70 because the inter-segment gaps 70 are not aligned with fluid flowing in the axial direction 40. The second ends 52 of the flexures may be aligned with the rotor axis 40 as shown, or the second ends 52 may be aligned with the inter-segment axis 72.

Figure 8:
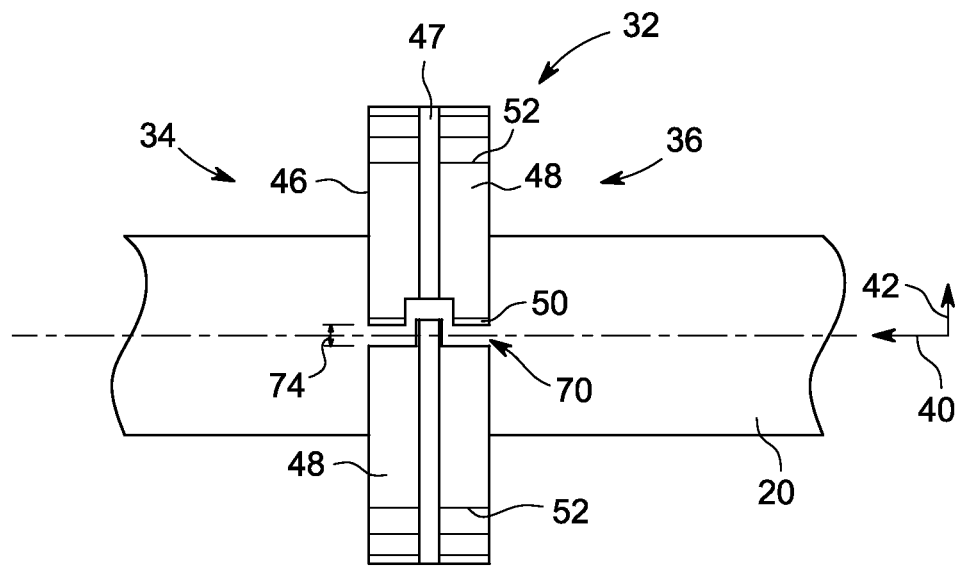
FIG. 8 is a top view of a seal assembly with inter-segment gaps that are not straight in an axial direction in accordance with an embodiment of the present disclosure.

FIG. 8 is a top view of one embodiment of the seal assembly 32. In the illustrated embodiment, the inter-segment gap 70 is not straight in the axial direction 40. Instead, the inter-segment gap 70 is configured in a labyrinth-like or tooth-like configuration. Such a configuration of the inter-segment gaps 70 provides a tortuous path that may help prevent axial leakage. Although not generally straight, some of the surfaces of the inter-segment gaps 70 are generally aligned with the rotor axis 40. In other embodiments, some of the surfaces of the inter-segment gaps 70 may be inclined at the second angle 90 similar to the seal assembly 32 shown in FIG. 7.

Figure 9:
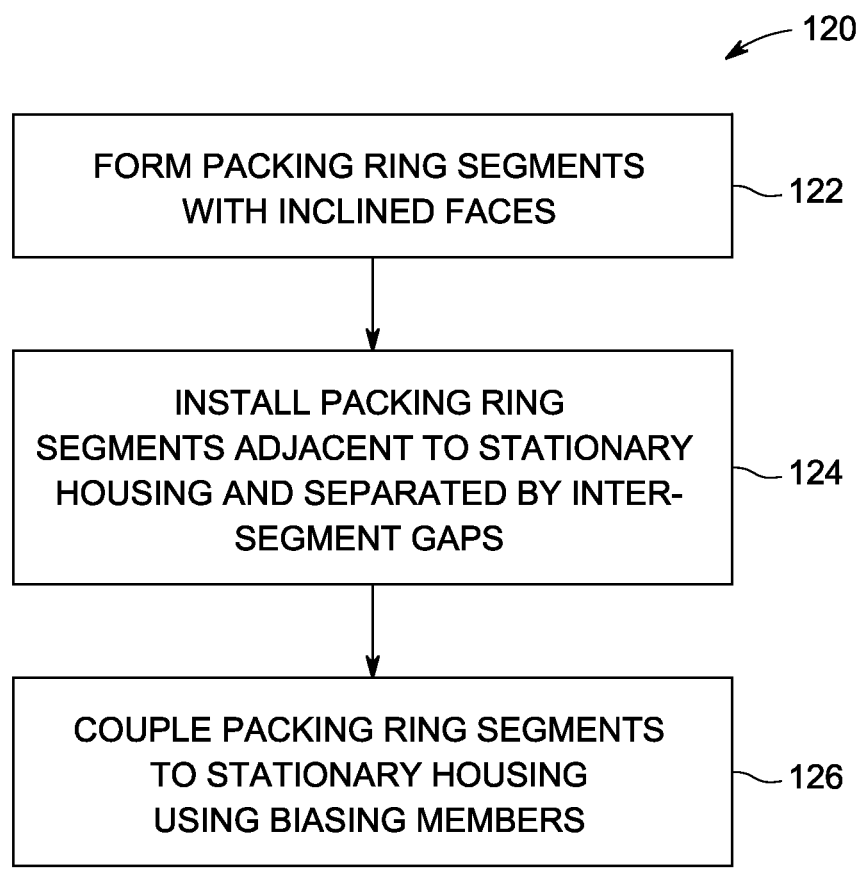
FIG. 9 is a flow chart of a process for manufacturing a seal assembly for a turbomachine in accordance with an embodiment of the present disclosure.

FIG. 9 is a flow chart of a process 120 for manufacturing the seal assembly 32. In a step 122, the packing ring segments 46 are formed with inclined faces. The faces may be generally flat or curved, for example. The packing ring segments 46 may be in the shape of a circular arc. In addition, the radial faces 54 of the packing ring segments 46 may be inclined at the first angle 56 from a radius of the circular arc. In a step 124, the packing ring segments 46 are installed adjacent to the stationary housing 18 and separated by the inter-segment gaps 70. The radial faces 54 of the packing ring segments 46 are installed such that the radial faces 54 are inclined in the direction of motion 58 of the packing ring segments 46 to enable the packing ring segments 46 to move in the direction of motion 58. In a step 126, the packing ring segments 46 are coupled to the stationary housing 18 using the biasing members 48. The biasing members 48 are configured to enable the packing ring segments 46 to move in the direction of motion 58, which may be generally along the inter-segment axis 72.

This written description uses examples to disclose the invention, including the best mode, and also to enable any person skilled in the art to practice the invention, including making and using any devices or systems and performing any incorporated methods. Further, the representative embodiments provided herein include features that may be combined with one another and with the features of other disclosed embodiments. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A seal assembly for a turbomachine, the turbomachine comprising a stationary housing and a rotor rotatable about an axis, the seal assembly comprising:
   a plurality of arcuate packing ring segments disposed intermediate to the rotor and the stationary housing;
   a plurality of inter-segment gaps disposed between the plurality of arcuate packing ring segments, wherein the plurality of inter-segment gaps are configured along a radial axis of the rotor; and
   a plurality of biasing members, each comprising two flexures forming a V shape having an apex when viewed along the axis of the rotor, disposed intermediate to the stationary housing and the plurality of arcuate packing ring segments and coupled to both, wherein each arcuate packing ring segment has at least one pair of biasing members symmetrically spaced apart by a bisecting axis of the respective arcuate packing ring segment with the apexes of the V shape biasing members facing away from each other.

2. The seal assembly of claim 1, wherein the symmetric coupling of the plurality of biasing members to the plurality of arcuate packing ring segments and the configuration of the plurality of inter-segment gaps allow the plurality of arcuate packing ring segments to move in a substantially radial direction.

3. The seal assembly of claim 1, wherein the plurality of inter-segment gaps are straight when viewed along the axis of the rotor.

4. The seal assembly of claim 1, where in the plurality of intersegment gaps are inclined at an angle from the axis of the rotor.

5. The seal assembly of claim 1,
   wherein the at least one pair of biasing members for a respective arcuate packing ring segment is configured to allow the respective arcuate packing ring segment to move in a radial direction but restrict movement in an axial direction.

6. The seal assembly of claim 1, comprising a progressive clearance labyrinth seal assembly configured to display self-correcting behavior when in operation.

* * * * *